(12) United States Patent
Leer et al.

(10) Patent No.: US 7,404,420 B2
(45) Date of Patent: Jul. 29, 2008

(54) TANK SPRAYER WITH INTEGRATED MEASURING DEVICE

(75) Inventors: Rick L. Leer, Somerset, PA (US); Douglas Burnworth, Somerset, PA (US)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 11/122,536

(22) Filed: May 5, 2005

(65) Prior Publication Data

US 2006/0249223 A1 Nov. 9, 2006

(51) Int. Cl.
*B65B 39/00* (2006.01)
(52) U.S. Cl. .................. 141/340; 141/95; 141/338; 239/74
(58) Field of Classification Search ............ 141/83, 141/94, 95, 100–105, 331–345; 239/329–333, 239/71, 74
See application file for complete search history.

(56) References Cited

U.S. PATENT DOCUMENTS

| 423,018 | A |   | 3/1890  | Young |
|---|---|---|---|---|
| 1,413,767 | A | * | 4/1922 | Nutting ........................ 141/344 |
| 2,024,168 | A | * | 12/1935 | Kneer ......................... 141/344 |
| 2,165,045 | A |   | 7/1939 | Garside |
| 3,490,290 | A | * | 1/1970 | Bilson .......................... 73/427 |
| 3,527,270 | A |   | 9/1970 | Weil |
| 3,606,092 | A | * | 9/1971 | Kollmai .................... 222/144.5 |
| 3,809,291 | A | * | 5/1974 | Purdy ....................... 222/145.1 |
| 4,292,846 | A |   | 10/1981 | Barnett |
| 4,298,038 | A |   | 11/1981 | Jennings |
| 4,767,027 | A |   | 8/1988 | Lewinter et al. |
| 5,228,488 | A | * | 7/1993 | Fletcher ...................... 141/331 |
| 5,295,610 | A |   | 3/1994 | Levison |
| 5,489,049 | A |   | 2/1996 | Robbins, III |
| 5,662,249 | A |   | 9/1997 | Grosse |
| 5,775,591 | A |   | 7/1998 | Fauci |
| 5,836,180 | A |   | 11/1998 | Herman-Latack et al. |
| 5,914,495 | A |   | 6/1999 | Ishizuka et al. ......... 250/559.45 |
| 6,263,732 | B1 | * | 7/2001 | Hoeting et al. ................. 73/427 |
| 6,624,884 | B1 |   | 9/2003 | Imaino et al. ............ 356/237.2 |
| 2001/0042402 | A1 |   | 11/2001 | Hoeting et al. |
| 2005/0029297 | A1 |   | 2/2005 | Hughes |

* cited by examiner

*Primary Examiner*—Timothy L Maust
(74) *Attorney, Agent, or Firm*—Maginot, Moore & Beck

(57) ABSTRACT

A portable sprayer includes a tank and a measuring device in selective fluid communication with the tank. The measuring device may be located adjacent to a funnel at the top of the tank and a valve provided to selectively control the flow of fluid from the measuring device into the funnel. The measuring device may include a plurality of surfaces extending from the internal wall of the measuring device to provide indicia of the amount of fluid within the measuring device.

15 Claims, 6 Drawing Sheets

TANK SPRAYER WITH INTEGRATED MEASURING DEVICE

FIELD OF THE INVENTION

The present invention relates to pressure sprayers and, more particularly, to portable pressure sprayers.

BACKGROUND OF THE INVENTION

Pressure sprayers are well known in the art, having been developed many years ago. They essentially consist of a tank that is adapted to hold a liquid and become pressurized with air. The tank becomes pressurized via a pump. When a spray head and/or wand that is attached to the pressurized tank is opened, the liquid within the tank is ejected from the spray head/wand by the pressure in the tank. Eventually, the pressure within the tank decreases with the ejection of liquid therefrom. When the pressure upon the liquid within the tank drops to a particular value, the liquid will not be ejected from the tank due to lack of pressure. The amount of liquid that is ejected before the pressure in the tank drops to the particular value is a function of both the volume of air in the tank and the pressure of the air. Therefore, in order to maintain (have) adequate pressure within the tank in order to eject the liquid therefrom, the pressure must be periodically increased. This is accomplished by a manually actuated pump associated with the pressure sprayer.

Such pressure sprayers may be used for spraying insecticides, pesticides, biocides, and herbicides, as well as paints, stains, water, and virtually any other low viscosity liquid. Small, portable (i.e. hand-carried) pressure sprayers have been used by the home and business industry. Early pressurized sprayers included metal canisters with a manually actuated pump. When these metal tanks were filled with a liquid, and manually pumped to the appropriate pressure, they were quite heavy and cumbersome to carry. Currently, most pressure sprayers are formed from a suitable plastic.

The liquid that is ejected from the pressure sprayers is typically mixed just prior to use. Accordingly, a concentrated solution of the toxic insecticide, pesticide, biocide, etc. is measured and mixed within the sprayer with a measured amount of water. Beneficially, only a small amount of the toxic solution is needed. The measurement of the correct amount of the solution in a small measuring vessel, however, may be problematic.

For example, measuring vessels typically include indicia marked upon the vessel walls, such as a line circumscribing the vessel. Such indicia are difficult to read. Accordingly, while positioning the vessel so as to be able to discern the markings, the vessel must also be balanced to maintain the vessel level. Additionally, the positioning and pouring of the toxic solution into some small measuring vessels such as teaspoons and tablespoons must be done without spilling the contents of the measuring vessel either on the ground or on the user.

In some measuring vessels, the user need only fill the vessel to the brim of the vessel in order to measure the desired amount. Such measuring vessels significantly ease the determination of when the desired amount has been measured. These vessels suffer, however, from an increased likelihood of spillage since the measured solution must be poured to the very brim of the measuring vessel and then the measuring vessel must be positioned over the tank prior to spilling any of the contents. Of course, some users may attempt to avoid spillage onto the ground by first positioning the measuring vessel over the tank. This approach may lead to undesired consequences when the measuring device is overfilled, dumping an undetermined amount of the solution into the tank.

Moreover, when measuring liquid having a high viscosity, some amount of the liquid tends to remain in the measuring vessel even after attempting to pour the contents of the vessel in to the tank. It is thus necessary to rinse the measuring vessel, and pour the rinsed solution into the tank. The rinsing of the measuring vessel is preferably also done without spilling the rinsed solution outside of the tank or on the user.

Of course, the measuring of the solution presupposes that an appropriate measuring device may be located. Many solutions are provided without any such measuring device. Moreover, even when a device is provided with the solution, the measuring device is frequently lost or misplaced. Accordingly, the user typically absconds with a measuring device previously used in measuring foodstuffs. While providing a short term solution, such misappropriation of measuring vessels may lead to various other problems, of which replacement of the measuring vessel may be the least problematic.

What is needed is a measuring device for use with hand-pressurized compressed air sprayers that is eases the process of determining the amount of fluid in the measuring device.

What is further needed is a measuring device for use with hand-pressurized compressed air sprayers that reduces the potential for spilling a measured fluid.

What is still further needed is a measuring device for use with hand-pressurized compressed air sprayers that simplifies rinsing of the measuring device.

What is also needed is a measuring device for use with hand-pressurized compressed air sprayers that may be stored with a hand-pressurized compressed air sprayer.

SUMMARY OF THE INVENTION

The present invention is a portable sprayer with a tank and a measuring device in selective fluid communication with the tank. In one embodiment, the measuring device is in selective fluid communication with the tank through a valved passageway.

In accordance with a further embodiment, a portable sprayer includes a tank with an opening for receiving a fluid to be ejected from the sprayer. A funnel is located above the opening of the tank and a measuring device is located adjacent to the funnel.

In yet another embodiment, a portable sprayer includes a tank for holding pressurized fluid and a measuring device in selective fluid communication with the tank. The measuring device includes an inner wall defining a cavity for receiving a fluid to be measured and a plurality of surfaces extending from the inner wall, each of the plurality of surfaces for indicating an amount of fluid within the cavity.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1:
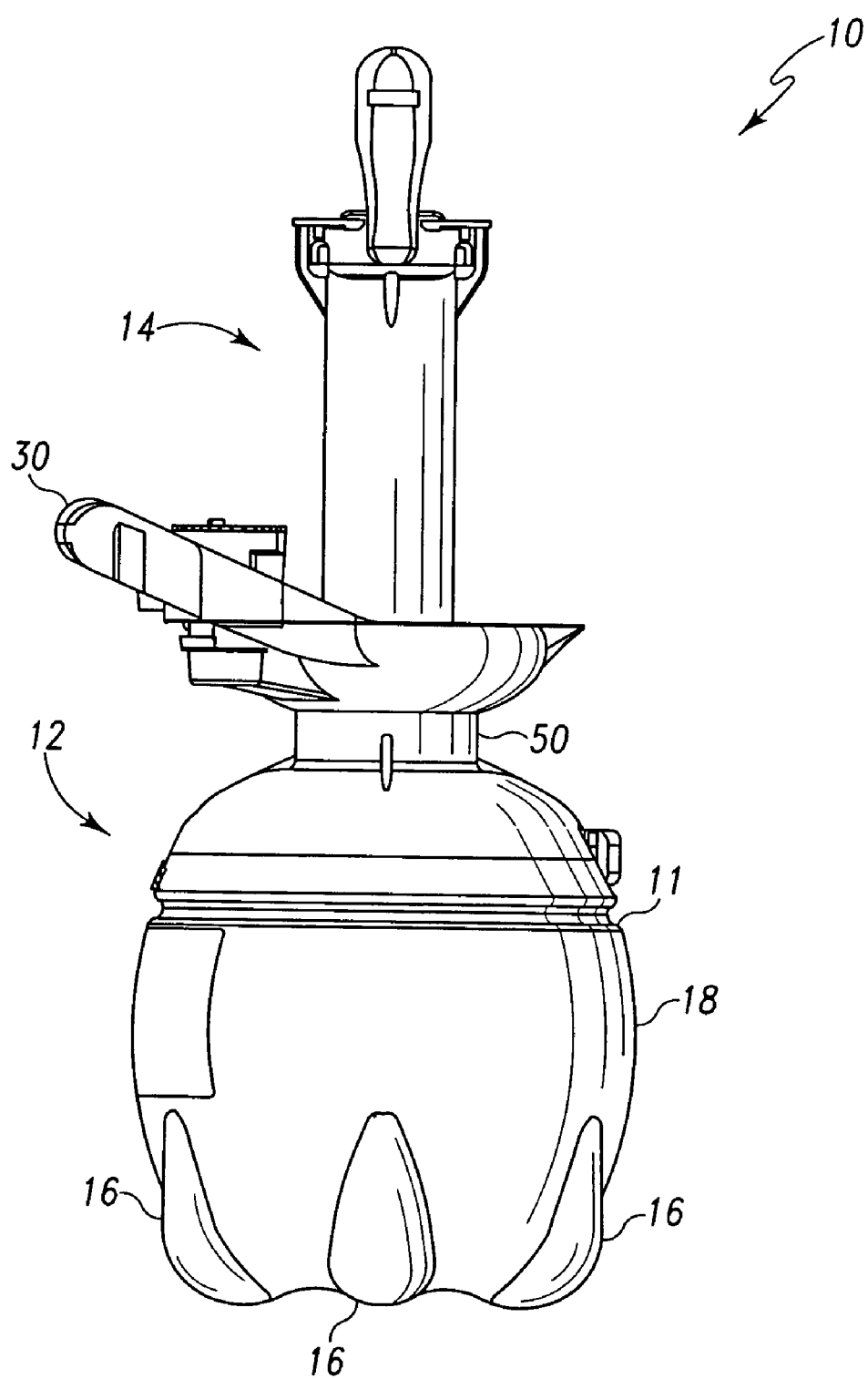
FIG. 1 shows a side elevational view of a portable pressure sprayer incorporating features of the present invention.

Referring now to the drawings and, more particularly to FIG. 1, there is shown a portable pressure sprayer generally designated 10. In the embodiment of FIG. 1, the pressure sprayer 10 is formed (e.g. molded) from a suitable plastic that is durable, able to withstand air pressure stress, and other stresses of use. Various thermoplastics may be used such as polyethylene, polypropylene, nylon, and the like. It should be appreciated that one type of plastic may be used for one component of the pressure sprayer 10 while another type of plastic may be used for other components. The pressure sprayer 10 includes a tank portion 12 and a pump portion 14.

The tank portion 12 is provided with a plurality of protuberances 16 which extend outwardly from the body 18 of the tank portion 12 and support the pressure sprayer 10 when the pressure sprayer 10 is placed on, for example, the ground. A fill line 11 indicates a level of fluid within the tank portion 12. The fill line 11 is a level indicator that may indicate, for example, the level within the tank portion 12 that corresponds to one liter or one gallon of fluid within the tank portion 12. Additional level indicators may be used if desired.

Figure 2:
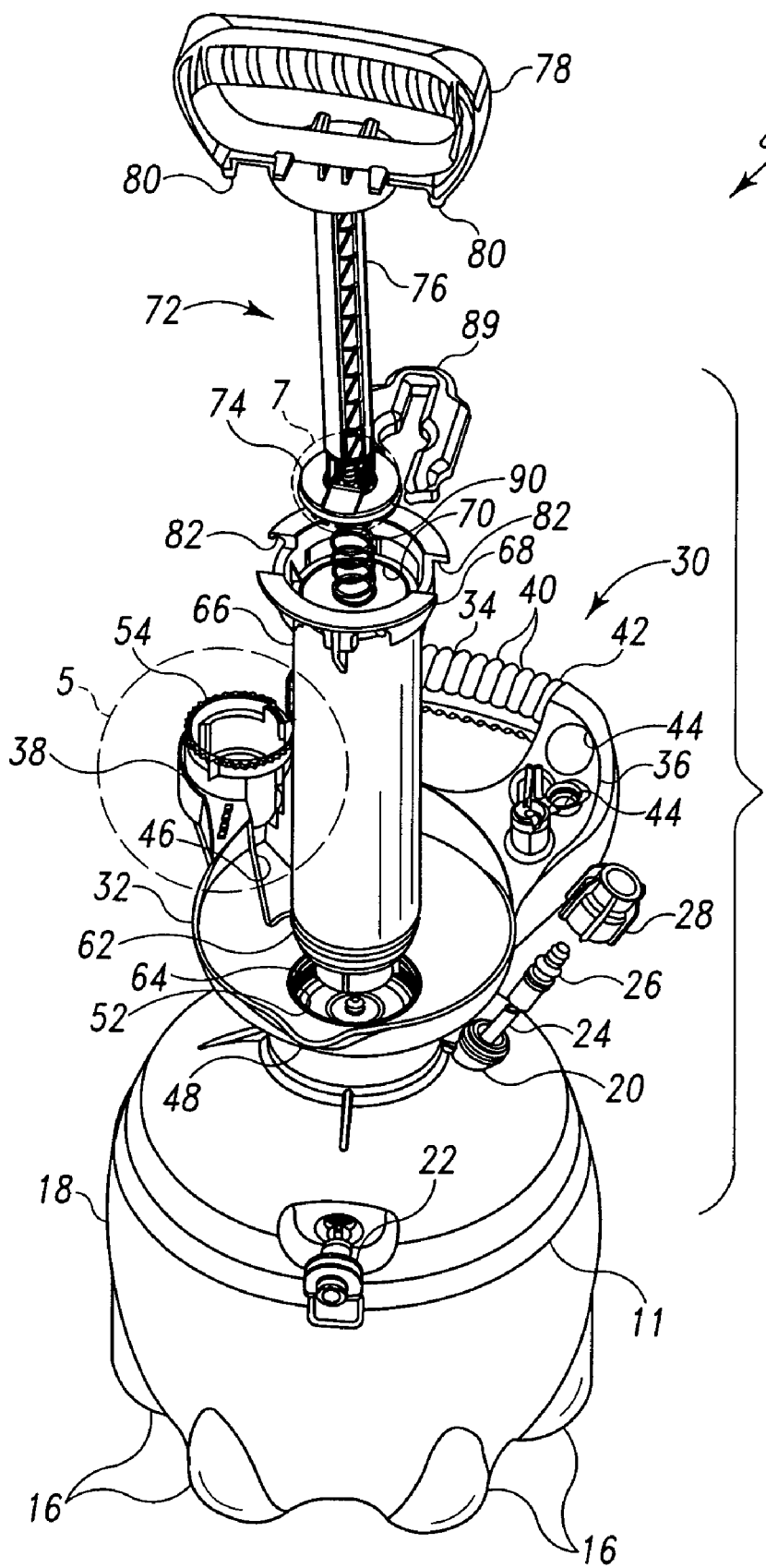
FIG. 2 shows an exploded perspective view of the portable pressure sprayer of FIG. 1.

The tank portion 12 also includes a hose bore 20 and a vent 22 shown in FIG. 2. The hose bore 20 allows a siphon tube 24 to be inserted into the body 18 of the tank portion 12. A hose or wand (not shown) is then connected to the siphon tube 24 using the hose connector unit 26 and a hose nut 28. The vent 22 is rotatable between a closed position wherein air is not allowed to pass through the vent 22 from the body 18 of the tank portion 12 and an open position wherein air is allowed to pass through the vent 22 from the body 18 of the tank portion 12 so as to de-pressurize the tank portion 12.

With continued reference to FIG. 2, the pressure sprayer 10 further includes a handle assembly 30 that is fixedly attached to the body 18 via a funnel 32. The handle assembly 30 is preferably formed of a solid plastic and is predominantly defined by a grip 34 that is attached to the funnel 32. At one side the handle assembly 30 includes a storage area 36 and at the other end a measuring device dock 38. The grip 34 is preferably formed with a plurality of ridges 40 in an arch portion 42 from a plastic material so as to allow a user to comfortably carry the pressures sprayer 10 by the handle assembly 30. The storage area 36 includes a plurality of receptacles formed therein for storage of various accessories used with the pressure sprayer 10 such as spray nozzles.

The funnel 32 includes a spillway 46 and a spout 48. The funnel 32 is adapted to direct fluids poured therein toward a neck 50 which is connected to the body 18 through an internally threaded portion 52. The spout 48 may be used to direct fluid within the pressure sprayer 10 to a desired location when it is desired to empty the pressure sprayer 10. The spillway 46 is adjacent the measuring device dock 38 so as to direct fluids from a measuring device 54 into the tank defined by the body 18.

Figure 3:
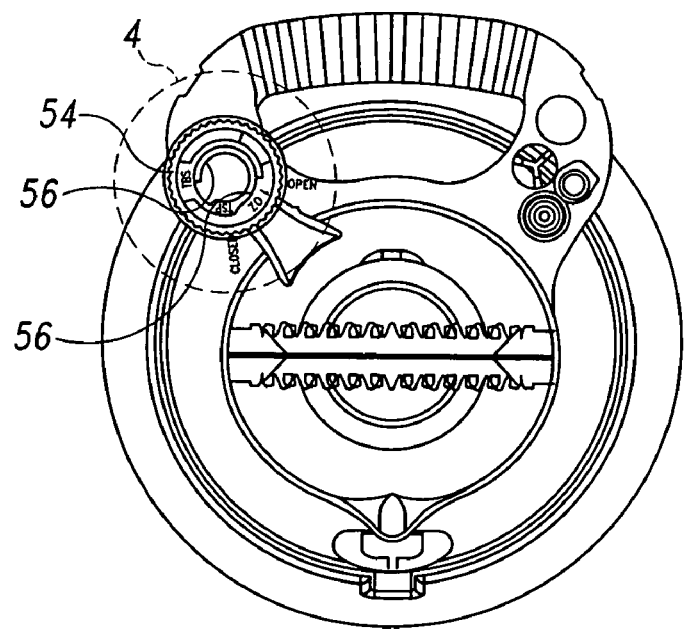
FIG. 3 shows a top elevational view of the portable pressure sprayer of FIG. 1.
Figure 4:
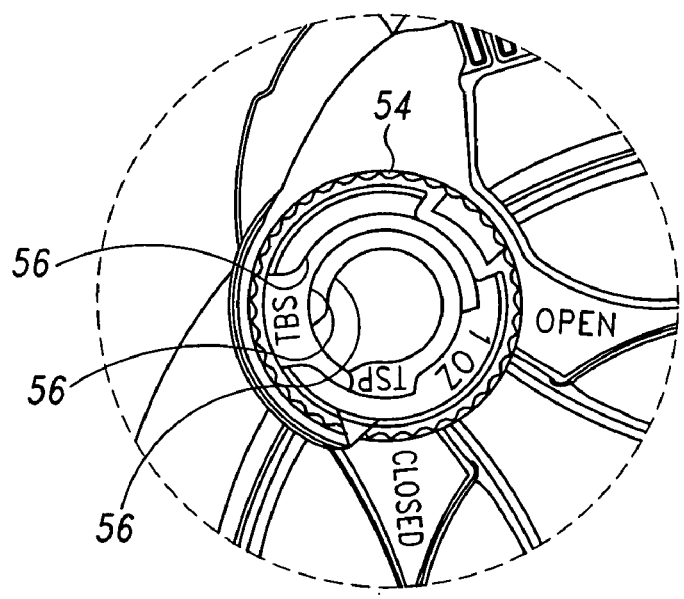
FIG. 4 shows a detail view of the internal ledges of the measuring device shown in FIG. 3.

The measuring device 54 in this embodiment is snap-fitted into the measuring device dock 38 so as to allow removal for cleaning of the measuring device 54. The measuring device 54 includes a number of internal ledges 56 as shown in FIGS. 3 and 4 wherein FIG. 4 shows the detail 4 of FIG. 3. The ledges 56 provide indicia of the amount of fluid within the measuring device 54. The internal ledges 56 in this embodiment are further provided with printed indicia of the amount of fluid within the measuring device 54. Thus, as a user is filling the measuring device 54 with a fluid such as an herbicide, fertilizer, etc., the amount of fluid within the measuring device 54 is readily discernable.

Figure 5:
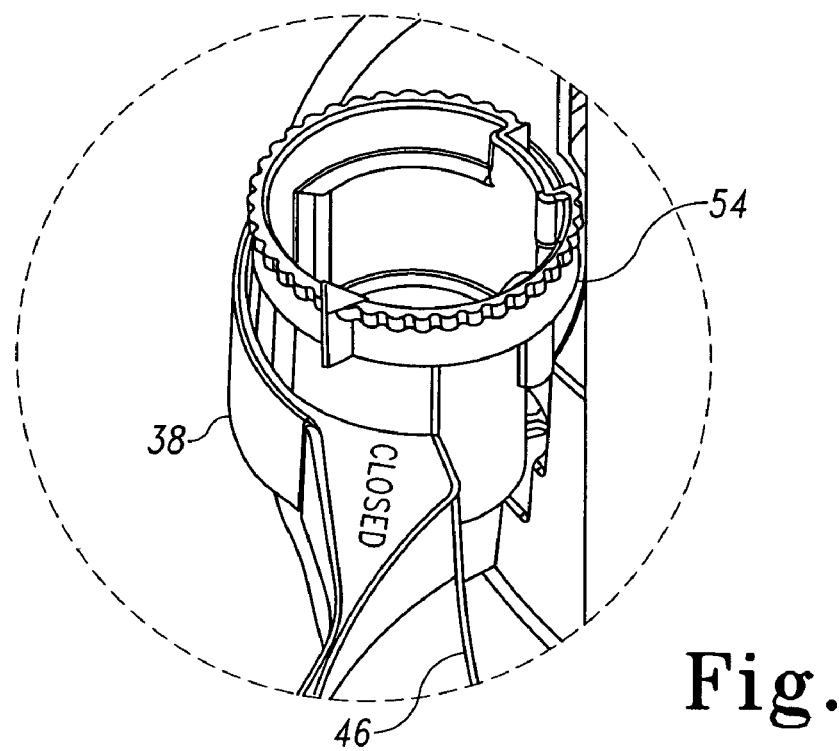
FIG. 5 shows a detail view of the measuring device and measuring dock of the portable pressure sprayer of FIG. 1 with the measuring device rotated to the closed position.
Figure 6:
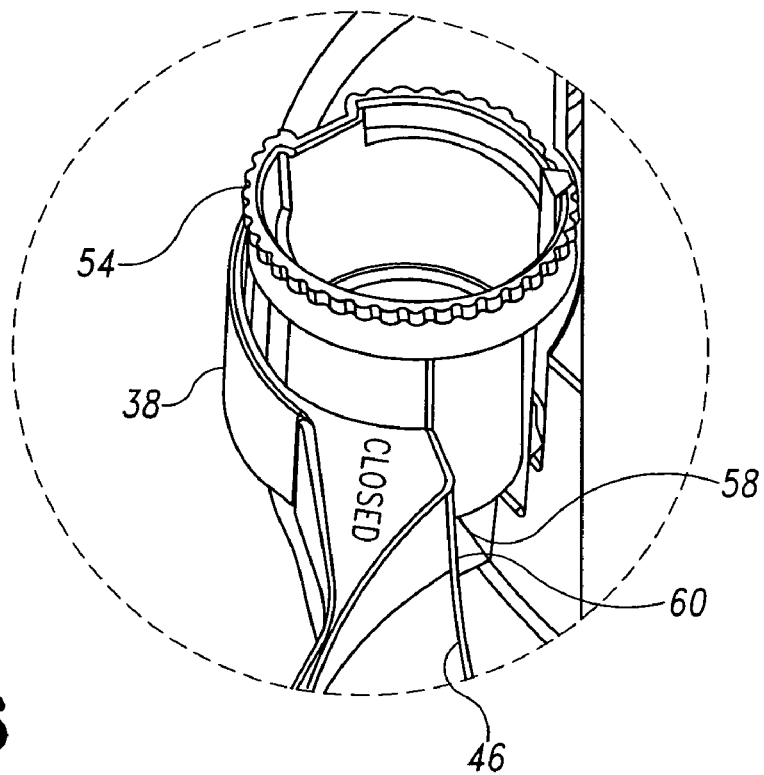
FIG. 6 shows a detail view of the measuring device and measuring dock of the portable pressure sprayer of FIG. 1 with the measuring device rotated to the open position.

The measuring device 54 is further rotatable within the measuring device dock 38 between a closed and an open position as shown in FIGS. 5 and 6 which show detail 5 of FIG. 2. Referring to FIG. 5, when the measuring device 54 is rotated into the closed position, there is no opening from the measuring device 54 to the spillway 46. Rotation of the measuring device 54 to the open position as shown in FIG. 6, however, aligns an opening 58 in the measuring device 54 with an opening 60 in the measuring device dock 38. Thus, fluid within the measuring device 54 is allowed to flow out of the measuring device 54 within the measuring device dock 38 into the spillway 46 through the internal passageway formed by the opening 58 and the opening 60. The measuring device 54 and the measuring device dock 38 thus form a valve controlling the flow of fluid from the measuring device 54 into the spillway 46.

The flow of fluid from a measuring device into a spillway may be controlled in a number of alternative manners. By way of example, a valve may be located within the measuring device that is opened upon insertion into the measuring device dock. Accordingly, the measuring device may be removed without spilling liquid within the measuring device. This is useful in the event that the measuring device has been overfilled. Additionally, the valve between the measuring device and the spillway may be provided in whole or in part by additional components which may be operated by pressing a button or lever.

Referring back to FIG. 2, the pump portion 14 includes an externally threaded portion 62 at a first end 64 of a cylindrical housing 66. A second end portion 68 includes a hole 70 therethrough adapted to receive a piston assembly 72. The piston assembly 72 includes a piston 74 at one end of a shaft 76 and a pump handle 78 at the opposite end of the shaft 76. The pump handle 78 includes two projections 80 configured to engage two cutouts 82 in the second end portion 68 of the cylindrical housing 66.

Figure 7:
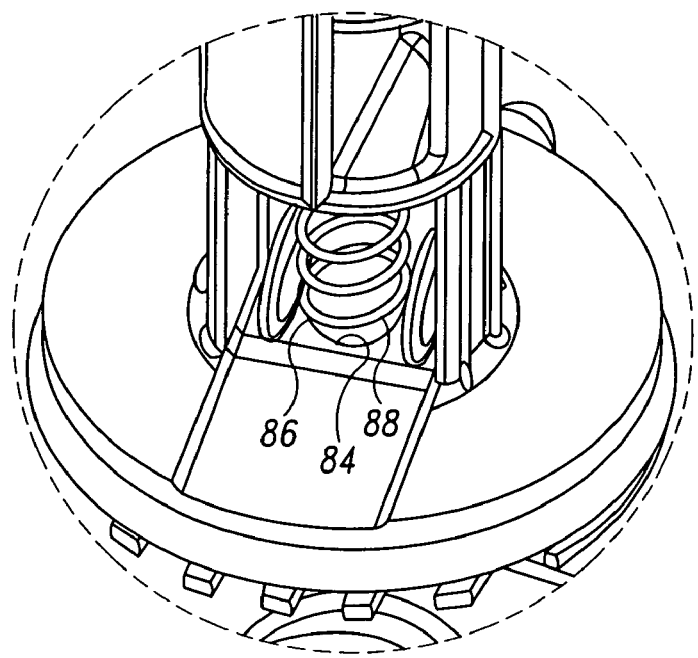
FIG. 7 shows a detail view of the pressure relief mechanism of the portable pressure sprayer of FIG. 1.

The piston 74 is sized to fit within the cylindrical housing 66 which defines a compression chamber. The piston 74 includes a hole 84 therethrough. As shown more clearly in FIG. 7, which shows the detail 7 of FIG. 2, a pressure relief ball 86 is sized to snugly fit against the rim of the hole 84. The pressure relief ball 86 is maintained in position against the rim of the hole 84 by a pressure relief spring 88.

When the pump portion 14 is assembled, the piston 74 is located within the cylindrical housing 66. A cushioning spring 90 is located between the piston 74 and the first end 64 of the cylindrical housing 66. The piston assembly 72 is maintained within the cylindrical housing 66 by a locking clip 89 that engages the second end portion 68 of the cylindrical housing 66.

The externally threaded portion 62 of the cylindrical housing 66 is complimentarily threaded with the threaded portion 52 of the neck 50. The first end 64 of the cylindrical housing 66 includes an opening therethrough such that when the pump portion 14 is threadedly engaged to the internally threaded portion 52 of the neck 50, the hole in the first end 64 aligns with the neck 50 allowing air to pass from within the compression chamber defined by the cylindrical housing 66 into the cavity defined by the body 18.

Figure 8:
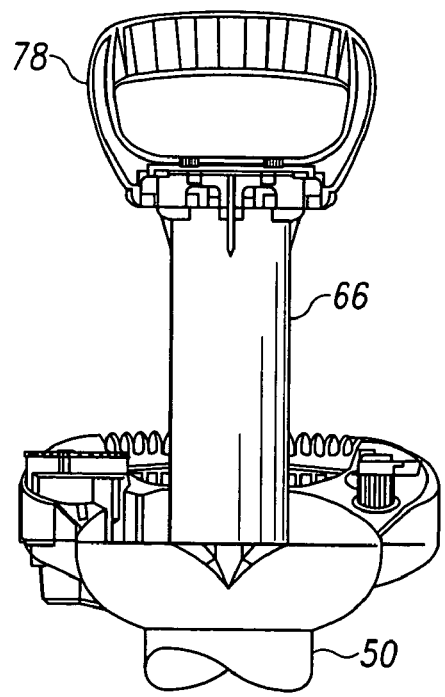
FIG. 8 shows a partial front elevational view of the portable pressure sprayer of FIG. 1.

In this embodiment, the externally threaded portion 62 is located proximate the first end 64 such that when the pump portion 14 is attached to the tank portion 12 the cylindrical housing 66 extends upwardly from the neck portion 50 as shown in FIG. 8. Thus, even when the shaft 76 is fully inserted within the cylindrical housing 66, the pump handle 78 is located high above the tank portion 12. The resulting height may be modified within the scope of the invention in a number of ways. By way of example, the external threads may be located higher up on the cylindrical housing to reduce the height. Alternatively, the length of the shaft and/or the length of the cylindrical housing may be increased for additional height or decreased for shorter height.

Figure 9:
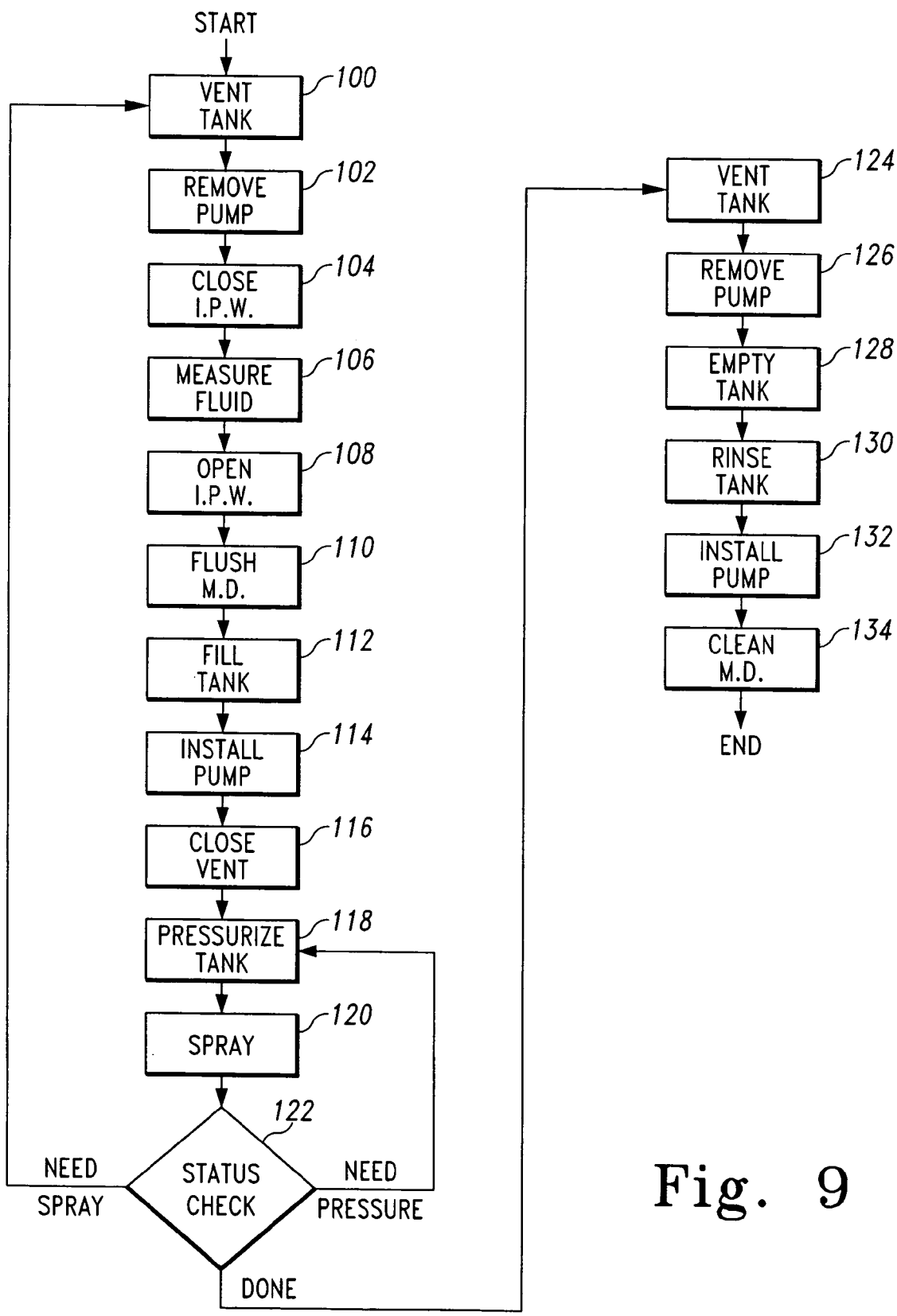
FIG. 9 shows a flow chart of one embodiment of a method using the portable pressure sprayer of FIG. 1.

FIG. 9 shows a method of operating the pressure sprayer 10 which begins with the pump portion 14 engaged with the tank portion 12 substantially as shown in FIG. 1 with the further connection of a wand to the hose bore 20. At step 100 the user ensures that the vent 22 is in the open position so as to equalize pressure within the tank with the atmospheric pressure. The pump portion 14 is then removed from the tank portion 22 at step 102 by rotating the pump handle 78 in the counter-clockwise direction with the projections 80 engaged with the cutouts 82. Because the pump handle 78 is engaged with the cylindrical housing 66 by the projections 80 within the cutouts 82, the rotation of the pump handle 78 causes the cylindrical housing 66 to rotate thereby unthreading the pump portion 14 from the tank portion 12.

At step 104, the internal passageway (I.P.W.) is closed by placing the measuring device 54 in the closed position within the measuring device dock 38. The desired amount of fluid to be measured by the measuring device 54 is then poured into the measuring device 54 at step 106. At step 108 the internal passageway between the measuring device 54 and the spillway 46 is opened by rotating the measuring device 54 to the open position. This aligns the opening 58 in the measuring device 54 with the opening 60 in the measuring device dock and allows the fluid within the measuring device 54 to flow into the spillway 46. The spillway 46 and the funnel 32 direct the measured fluid to the neck 50 and into the cavity formed by the body 18.

At step 110 the measuring device 54 (M.D.) is flushed with the fluid that will be mixed with the measured fluid, typically water. The desired amount of mix fluid is then provided at step 112 by directing the fluid into the funnel 32 which in turn directs the fluid to the neck 50 and into the cavity formed by the body 18. At step 114 the pump portion 14 is threadedly engaged to the tank portion 12 by reversing the process described above for removing the pump portion 14.

Once the vent 22 is rotated to the closed position at step 116, the tank portion 12 may be pressurized at step 118 by grasping the pump handle 78 and reciprocating the pump handle 78. Downward movement of the pump handle 78 causes air within the cylindrical housing 66 to be forced through a check valve (not shown) in the first end 64 of the cylindrical housing 66. The check valve allows air to flow out of the compression chamber of the cylindrical housing 66 through the first end portion 64 but air is not allowed to flow into the compression chamber through the first end 64. Thus, the air within the cylindrical housing 66 is forced through the neck 50 into the cavity defined by the body 18 thereby pressurizing the tank portion 12.

Various safety features are implicated during pressurization of the tank portion 12. For example, as the pump handle 78 continues to move downward and nears the first end 64, the cushioning spring 90 begins to be compressed. This signals the user that the downward stroke should be terminated and slows the downward stroke of the piston assembly 72 so as to prevent damage to the piston assembly 72. Additionally, in the event a user attempts to over pressurize the tank portion 12, the pressure inside of the cylindrical housing 66 underneath the piston 74 will exceed the pressure exerted by the pressure relief spring 88 on the pressure relief ball 86.

Continuing with FIG. 9, once the tank portion 12 has been appropriately pressurized, the contents of the tank portion 12 may be sprayed at step 120 by opening a valve on the wand (not shown). If movement of the pressure sprayer 10 is desired during the spray operation, then a user grasps the handle assembly 30 and lifts the pressure sprayer 10. The handle assembly 30 is configured such that when it is used to lift the pressure assembly 10, the pump portion 14 does not interfere with the movement of the user.

At step 122, a status check is performed. If additional spraying is desired but there is insufficient fluid remaining in the tank portion 12, then the operation returns to step 100 and the tank is vented, re-filled and re-pressurized. If additional spraying is desired but there is insufficient pressure in the tank portion 12, then the process returns to step 118 and the tank portion 12 is re-pressurized.

If the spray operation is completed, then the process continues at step 124 wherein the vent 22 is rotated to the open position so as to equalize pressure within the tank with the atmospheric pressure. The pump portion 14 is then removed from the tank portion 22 at step 126 by rotating the pump handle 78 in the counter-clockwise direction with the projections 80 engaged with the cutouts 82 in the manner described above for step 102. At step 128, the fluid remaining within the tank portion 12 is poured out of the tank portion 12 using the spout 48 to direct the fluid to the desired place such as an appropriate storage vessel. The tank portion 12 is then rinsed at step 130 and the pump portion is re-attached to the tank portion 12 at step 132 in the manner described with respect to step 114.

At step 134 the measuring device 54 is cleaned by removing, rinsing and re-inserting the measuring device 54 into the measuring device dock 38. The process then ends.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A pressure sprayer, comprising:
   a tank for holding fluid, said tank having a rim that defines a tank opening configured to allow fluid to be advanced into the tank through said tank opening;

a funnel having (i) an upper portion defining an upper funnel opening, (ii) a lower portion defining a lower funnel opening, and (iii) an interior space positioned between said upper funnel opening and said lower funnel opening, wherein said lower portion of said funnel is attached to said rim of said tank so that fluid exiting from said lower funnel opening is advanced through said tank opening;

a measuring device dock attached to said funnel and defining a receptacle; and a measuring device configured to be received within said receptacle of said measuring device dock, said measuring device defining a fluid reservoir that is in fluid communication with said interior space of said funnel via a valve mechanism when said measuring device is positioned within said receptacle of said measuring device dock.

2. The pressure sprayer of claim 1, wherein the measuring device is movable between (i) a first location in which the measuring device is located within said receptacle of said measuring device dock, and (ii) a second location in which the measuring device is removed from the measuring device dock.

3. The pressure sprayer of claim 2, wherein the measuring device is rotatable within the measuring device dock between a first position and a second position, such that when the measuring device is in the first position the measuring device is in fluid communication with the interior space of the funnel and when the measuring device is in the second position the measuring device is not in fluid communication with the interior space of the funnel.

4. The pressure sprayer of claim 3, wherein the funnel, the tank and the measuring device dock are all integrally formed.

5. The pressure sprayer of claim 2, wherein the measuring device dock is configured to receive the measuring device with a snap fit.

6. The pressure sprayer of claim 1, wherein the measuring device is rotatable between a first position and a second position, such that (i) when the measuring device is in the first position, fluid in the measuring device is allowed to flow from the fluid reservoir of the measuring device to the interior space of the funnel through the valve mechanism, and (ii) when the measuring device is in the second position, fluid in the measuring device is constrained from flowing from the fluid reservoir of the measuring device to the interior space of the funnel through the valve mechanism.

7. The pressure sprayer of claim 1, wherein:
the measuring device comprises: an inner wall defining a cavity for receiving a fluid to be measured; and a plurality of surfaces extending from the inner wall, each of the plurality of surfaces for indicating an amount of fluid within the cavity, and the inner wall and the plurality of surfaces define said fluid reservoir.

8. The pressure sprayer of claim 7, wherein the measuring device further comprises: indicia on each of the plurality of surfaces for indicating an amount of fluid within the cavity.

9. The pressure sprayer of claim 1, further comprising a hand pump configured to pressurize said tank with air, wherein:
the hand pump is further configured to be attached to said rim of said tank, and the hand pump extends through said internal space of said funnel when said hand pump is attached to said rim of said tank.

10. The pressure sprayer of claim 9, wherein said hand pump further extends through said upper funnel opening and said lower funnel opening when said hand pump is attached to said rim of said tank.

11. The pressure sprayer of claim 1, wherein said receptacle of said measuring device dock is located outside of said interior space of said funnel.

12. A portable sprayer comprising:
a tank with an opening for receiving a fluid to be ejected from the sprayer;

a funnel coupled to the tank above the opening of the tank; and a measuring device coupled to the funnel, wherein the measuring device is rotatable between a first and a second position such that when the measuring device is in the first position, fluid within the measuring device is allowed to flow into the funnel and when the measuring device is in the second position, fluid within the measuring device is constrained from flowing into the funnel, and further comprising: a handle extending upwardly and outwardly from the tank; and a measuring device dock for rotatably holding the measuring device, the measuring device dock integrally formed with the handle.

13. The portable sprayer of claim 12, wherein the measuring device is removable from the measuring device dock.

14. A portable sprayer comprising:
a tank for holding pressurized fluid;

a measuring device operatively coupled to the tank and in selective fluid communication with the tank, the measuring device having an inner wall defining a cavity for receiving a fluid to be measured and a plurality of surfaces extending from the inner wall, each of the plurality of surfaces for indicating an amount of fluid within the cavity; and a funnel adjacent to the measuring device and in selective fluid communication with the tank, wherein the measuring device is rotatable between a first and a second position such that when the measuring device is in the first position, fluid within the measuring device is allowed to flow into the funnel and when the measuring device is in the second position, fluid within the measuring device is constrained from flowing into the funnel further comprising a handle extending upwardly and outwardly from the funnel; and a measuring device dock for rotatably holding the measuring device, the measuring device dock integrally formed with the handle.

15. The portable sprayer of claim 14, wherein the measuring device is removable from the measuring device dock.

* * * * *